No. 797,183. PATENTED AUG. 15, 1905.
R. F. DAVIS.
INJECTOR.
APPLICATION FILED OCT. 10, 1904.
2 SHEETS—SHEET 1.
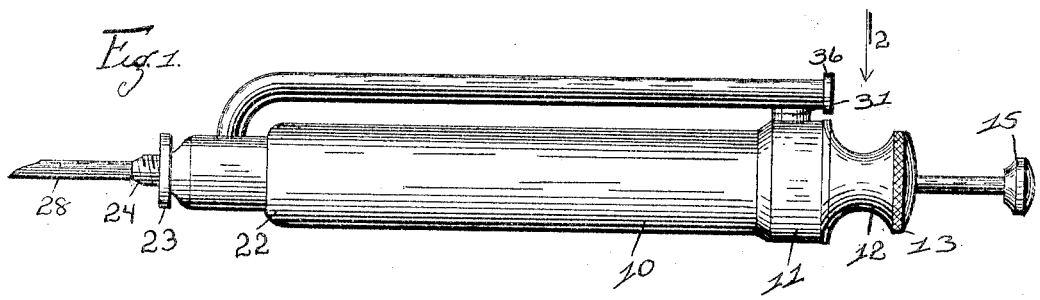
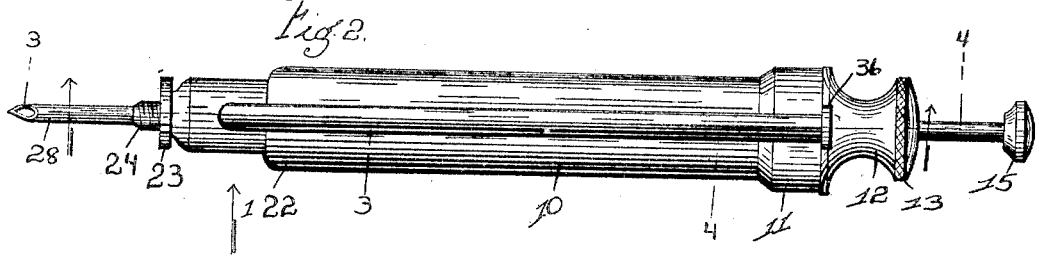
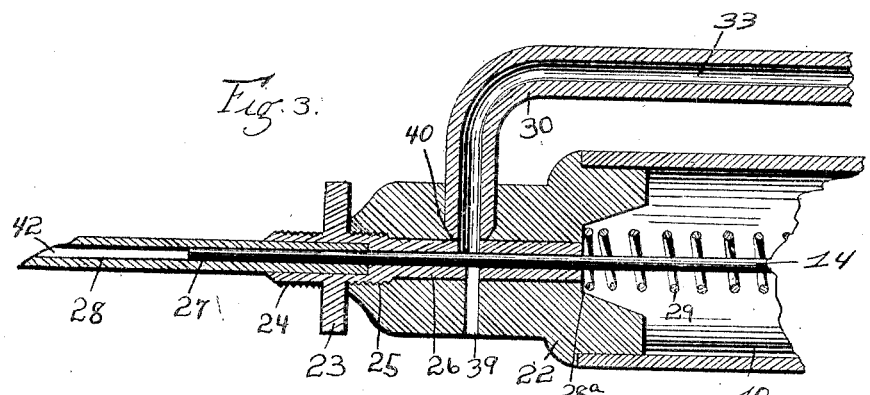
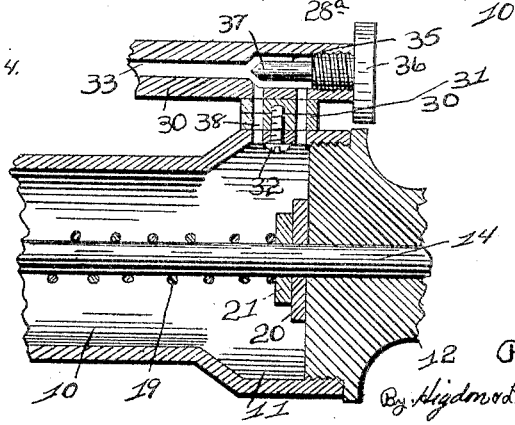
WITNESSES:
Edw. M. Harrington
Alfred R. Dicks
INVENTOR:
Roy F. Davis
By Higdon & Longan & Hopkins Attys No. 797,183. PATENTED AUG. 15, 1905.
R. F. DAVIS.
INJECTOR.
APPLICATION FILED OCT. 10, 1904.
2 SHEETS—SHEET 2.
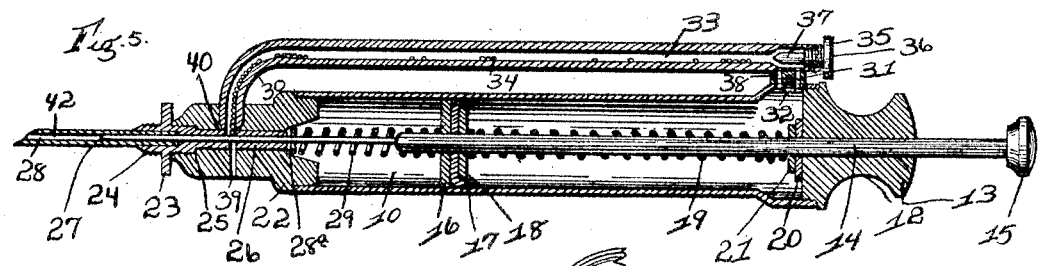
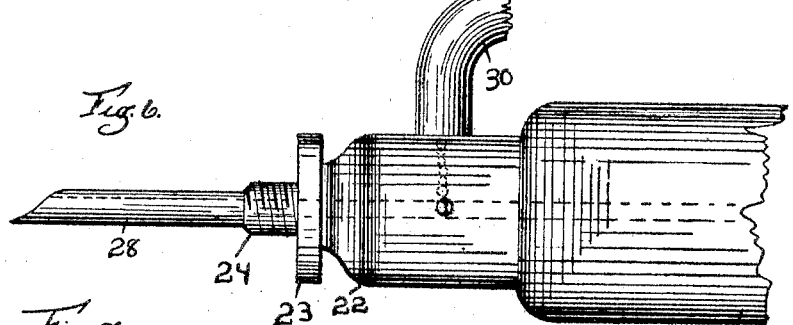
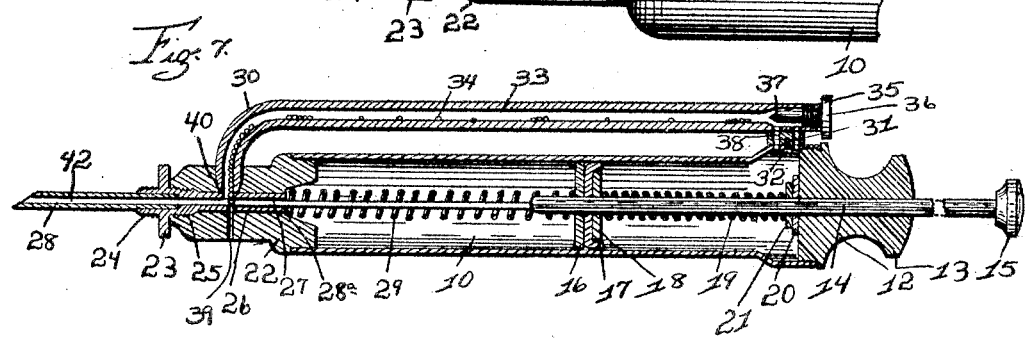
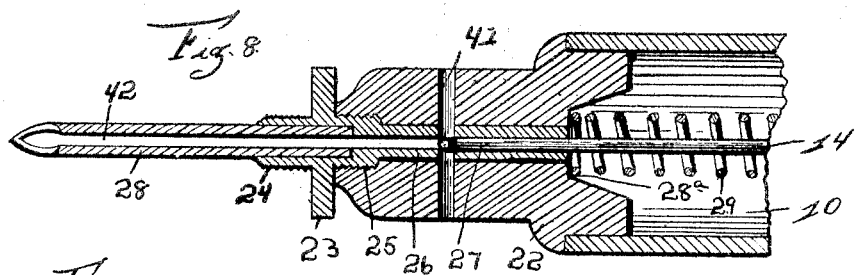
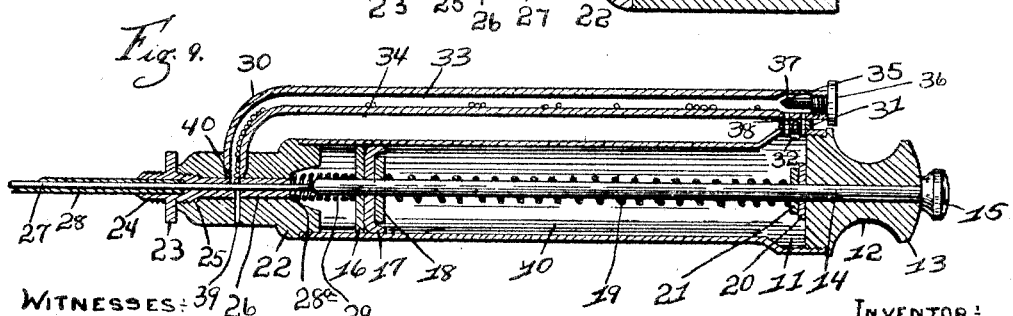
WITNESSES:
Edw. M. Harrington
Alfred Fuchs
INVENTOR:
Roy. F. Davis
By Higdon & Longan & Hopkins Attys

UNITED STATES PATENT OFFICE.

ROY F. DAVIS, OF CARBONDALE, ILLINOIS.

INJECTOR.

No. 797,183. Specification of Letters Patent. Patented Aug. 15, 1905.

Application filed October 10, 1904. Serial No. 227,931.

*To all whom it may concern:*

Be it known that I, ROY F. DAVIS, a citizen of the United States, and a resident of Carbondale, county of Jackson, State of Illinois, have invented certain new and useful Improvements in Injectors, of which the following is a specification containing a full, clear, and exact description, reference being had to the accompanying drawings, forming a part hereof.

My invention relates to improvements in injectors of the class used in inoculating animals with virus, the virus being in the form of pellets; and it consists of the novel features herein shown, described, and claimed.

My object is to construct an injector having a magazine to receive the pellets and to arrange the mechanism so that the pellets will be fed and injected one at a time.

In the drawings, Figure 1 is a side elevation of an injector embodying the principles of my invention as seen looking in the direction indicated by the arrow 1 in Fig. 2. Fig. 2 is a top plan view as seen looking in the direction indicated by the arrow 2 in Fig. 1. Fig. 3 is an enlarged sectional detail on the line 3 3 of Fig. 2 and looking in the direction indicated by the arrow. Fig. 4 is an enlarged sectional detail on the line 4 4 of Fig. 2 and looking in the direction indicated by the arrow. Fig. 5 is a sectional elevation on a plane parallel with Fig. 1 and showing the parts in their normal position. Fig. 6 is a view analogous to Fig. 1, showing the needle end of the injector upon an enlarged scale, parts being broken away to economize space. Fig. 7 is a view analogous to Fig. 5 and showing the plunger withdrawn to feed a pellet to the needle. Fig. 8 is an enlarged sectional detail on the line 8 8 of Fig. 6. Fig. 9 is a view analogous to Figs. 5 and 7 and showing the plunger moved forwardly to inject the pellet.

Referring to the drawings in detail, the pump-cylinder 10 is expanded at its upper end to produce the enlargement and the bearing block 12 is screw-seated in this enlargement, said bearing-block serving to close the upper end of the cylinder, and a handle 13 extends upwardly from the bearing-block.

The pump piston-rod 14 is slidingly mounted through the center of the bearing-block 12, there being a handle 15 on the upper end of the rod for operating the rod. The pump-piston consists of the metal plate 16, the leather washer 17, and the metal plate 18, mounted upon the lower end of the piston-rod within the cylinder. An expansive coil-spring 19 is mounted upon the piston-rod above the piston. A leather washer 20 is mounted upon the piston-rod against the lower face of the bearing-block 12 and a metal spring-seat 21 is mounted upon the piston-rod against the washer, said washer 20 and spring-seat 21 forming a stuffing-box around the piston-rod below the bearing-block. The injector-head 22 is mounted in the lower end of the pump-cylinder 10.

The needle-holder comprises the nut 23, the screw-threaded nipple 24 extending forwardly from the nut, the screw-threaded nipple 25 extending backwardly from the nut, and the bushing 26 extending backwardly from the nipple 25 through the injector-head 22. The injector-plunger 27 is fixed in the lower end of the piston-rod 14 and slidingly mounted through the bushing 26. The hollow needle 28 is fixed in the end of the nipple 24, the bore of the needle being in line with the bore of the bushing 26, so that the plunger 27 may pass downwardly through the needle. The upper end of the head 22 is countersunk to form the spring-seat $28^a$, and the expansive coil-spring 29 is placed around the lower end of the piston 14 between the plate 16 and the spring-seat $28^a$. The tension of the springs 19 and 29 is so proportioned that the piston is held normally in the position shown in Fig. 5, with the plunger 27 closing the discharge end of the magazine. The magazine is a bent tube 30, the upper and central portion of the tube being parallel with the pump-cylinder and the lower end of the tube being bent at right angles and inserted into the head 22. A spacing-block 31 is formed in two pieces and is placed between the upper end of the magazine and the enlargement 11, one piece of the spacing-block being soldered to the magazine and the other piece being soldered to the enlargement 11, and a screw 32 is inserted from the inside of the pump-cylinder through one piece of the spacing-block and screw-seated in the other piece to hold the upper end of the magazine in position. The opening 33 through the magazine is larger than the pellets 34, and the upper end of the magazine is still further enlarged to form the funnel-shaped receiving-opening 35, and a cap 36 is screw-seated in this opening. A vent-shield 37 extends downwardly from the cap 36 to a point beyond the vents 38, which lead from the pump-cylinder through the spacing-block into the magazine. The vent 39 is formed through the head 22 in line with the discharge end 40 of the magazine, said vent 39 being smaller than the pellets. A sight-hole 41 is formed through the head 22 on a line crosswise of the vent 39, the center of the sight-hole being above the center of the pellets as they are fed from the magazine. The opening 42 through the needle is smaller than the pellets.

The operation is as follows: The parts are normally in the position shown in Fig. 5, with the lower end of the plunger in the passage below the discharge end of the magazine, so as to hold the pellets in the magazine. The cap 36 is removed and the magazine filled and the cap replaced. The handle 15 is grasped in one hand and the handle 13 in the other hand. The pump-piston is elevated, thereby forcing the air through the vents 38 into the magazine and forcing the pellets to the lower end of the magazine. This operation also elevates the plunger 27 to a point above the line of the discharge end of the magazine and allowing a pellet to pass into the path of the plunger. The vent 39 and the opening 42 through the needle being smaller than the pellet, the pellet will remain in the position shown in Fig. 7 in front of the end of the plunger until the plunger is pressed downwardly. When the handle 15 is moved toward the handle 13, the pellet is forced through the needle and discharged, as shown in Fig. 9.

When it is desired to inject virus into an animal, the needle is inserted under the skin, then the plunger pushed downwardly to force the pellet through the needle and held in this position while the needle is withdrawn, thereby leaving the pellet under the skin of the animal.

I claim—

1. In an injector: a hollow needle; a plunger mounted to operate in the needle; a magazine discharging into the needle; and a piston operated by the plunger and connected to the magazine; said piston being adapted to force air into the magazine when the plunger is withdrawn.

2. In an injector: a hollow needle; a plunger operating in the needle; a magazine discharging into the needle; and a pump operating in conjunction with the plunger to force air into the magazine when the plunger is withdrawn.

3. In an injector: a piston-casing; a bearing-block mounted in one end of the piston-casing; an injector-head mounted in the other end of the piston-casing; a piston operating in the piston-casing; a hollow needle mounted in the injector-head; a plunger carried by the piston and operating through the needle; a magazine discharging to the point of the plunger when withdrawn; the opposite end of the magazine being connected to the pump; substantially as specified.

4. In an injector: a piston-casing; a bearing-block mounted in one end of the piston-casing; an injector-head mounted in the other end of the piston-casing; a piston operating in the piston-casing; a hollow needle mounted in the injector-head; a plunger carried by the piston and operating through the needle; a magazine discharging to the point of the plunger when withdrawn; the opposite end of the magazine being connected to the pump; there being springs to hold the piston in its normal position with the plunger closing the discharge end of the magazine; substantially as specified.

In testimony whereof I have signed my name to this specification in presence of two subscribing witnesses.

ROY F. DAVIS.

Witnesses:
JOHN FREY,
W. P. LIGHTFOOT.